（12） United States Patent
Lawrence

(10) Patent No.: US 9,386,775 B2
(45) Date of Patent: Jul. 12, 2016

(54) VACUUM PRESSING PLATE ASSEMBLY

(71) Applicant: Lawrence Equipment Inc., South El Monte, CA (US)

(72) Inventor: Eric Lawrence, So. El Monte, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 319 days.

(21) Appl. No.: 14/103,759

(22) Filed: Dec. 11, 2013

(65) Prior Publication Data

US 2014/0096352 A1   Apr. 10, 2014

Related U.S. Application Data

(63) Continuation of application No. 12/434,099, filed on May 1, 2009, now Pat. No. 8,746,133.

(60) Provisional application No. 61/049,685, filed on May 1, 2008.

(51) Int. Cl.
*A21C 9/00* (2006.01)
*A21C 11/00* (2006.01)
*B23P 15/00* (2006.01)

(52) U.S. Cl.
CPC . *A21C 9/00* (2013.01); *A21C 11/00* (2013.01); *A21C 11/006* (2013.01); *B23P 15/00* (2013.01); *Y10T 29/49815* (2015.01)

(58) Field of Classification Search
CPC ............ A21C 9/02; A21C 9/08; A21C 11/00; A21C 11/002; A21C 11/004; A21C 11/006; A47J 37/00
See application file for complete search history.

(56) References Cited

U.S. PATENT DOCUMENTS

| | | |
|---|---|---|
| 1,016,258 A | 2/1912 | Francis |
| 1,379,816 A | 5/1921 | Fred |
| 1,748,412 A | 2/1930 | Crawford |
| 2,018,736 A | 10/1935 | Norris |
| 2,614,590 A | 10/1952 | Hervey |

(Continued)

FOREIGN PATENT DOCUMENTS

| | | |
|---|---|---|
| CN | 2290193 | 9/1998 |
| CN | 2394991 Y | 9/2000 |

(Continued)

OTHER PUBLICATIONS

International Search Report and Written Opinion in PCT/US2011/059348, dated Apr. 3, 2012, 15 pages.

(Continued)

*Primary Examiner* — Brian Jennison
(74) *Attorney, Agent, or Firm* — Fish & Richardson P.C.

(57) ABSTRACT

A dough forming apparatus comprising a lower support frame, a lower pressing platen coupled to the lower support frame, and an upper pressing platen assembly positioned above the lower pressing platen. The upper pressing platen assembly further comprises a backing structure, an upper backing platen coupled to the backing structure, and a pressing plate removably coupled to the upper backing platen by vacuum or electromagnetic means. Means for heating the pressing plate, and shims for adjusting the flatness of the pressing surface are provided. A conveyor supported by the lower support frame is positioned to pass between the lower pressing platen and the upper pressing platen assembly. A method of adjusting the apparatus is also disclosed.

23 Claims, 6 Drawing Sheets

(56) References Cited

U.S. PATENT DOCUMENTS

| | | |
|---|---|---|
| 2,858,860 A | 11/1958 | O Donnell |
| 3,104,754 A | 9/1963 | Andersen |
| 3,321,807 A | 5/1967 | O Brien |
| 3,382,530 A | 5/1968 | Glesner |
| 3,398,679 A | 8/1968 | Francis |
| 3,619,310 A | 11/1971 | Clarke |
| 3,956,058 A | 5/1976 | Wemhoener |
| 3,980,616 A | 9/1976 | Kimura |
| 4,053,276 A | 10/1977 | Ahrweiler |
| 4,116,119 A | 9/1978 | Kuhlman |
| 4,164,387 A | 8/1979 | Schermutzki |
| 4,417,867 A | 11/1983 | Bauer |
| 4,753,160 A | 6/1988 | Baird |
| 4,769,106 A | 9/1988 | Busching |
| 4,776,789 A | 10/1988 | Ehrich |
| 4,905,581 A | 3/1990 | Kirkpatrick |
| 4,938,126 A | 7/1990 | Rubio |
| 5,006,358 A | 4/1991 | Ribio |
| 5,231,919 A | 8/1993 | Lawrence |
| RE34,530 E | 2/1994 | Kirkpatrick |
| 5,300,170 A | 4/1994 | Donohoe |
| 5,501,140 A | 3/1996 | Balleza et al. |
| 5,649,473 A | 7/1997 | Lawrence |
| 5,918,533 A | 7/1999 | Lawrence |
| 6,083,083 A | 7/2000 | Nishimura |
| 6,112,647 A | 9/2000 | Brunner |
| 6,244,167 B1 | 6/2001 | McCarney |
| 6,244,941 B1 | 6/2001 | Bowman |
| 6,250,217 B1 | 6/2001 | Korybutiak |
| 6,302,767 B1 | 10/2001 | Tietz |
| 6,398,539 B1 | 6/2002 | Lawrence |
| 6,638,553 B2 | 10/2003 | Bell |
| 6,835,118 B2 | 12/2004 | Berkstresser |
| 7,067,167 B2 | 6/2006 | Damsgard |
| 7,086,325 B2 | 8/2006 | Armstrong |
| 7,229,270 B2 | 6/2007 | Schultz |
| 7,435,593 B2 | 10/2008 | Park |
| 8,689,685 B2 | 4/2014 | Lawrence |
| 2003/0066436 A1 | 4/2003 | Bell |
| 2004/0191378 A1 | 9/2004 | Golby et al. |
| 2005/0287240 A1 | 12/2005 | Mattias |
| 2006/0162515 A1 | 7/2006 | Vogeley |
| 2007/0045232 A1 | 3/2007 | Murai |
| 2009/0272277 A1 | 11/2009 | Lawrence |
| 2010/0126672 A1 | 5/2010 | Meisser et al. |
| 2012/0114812 A1 | 5/2012 | Lawrence |

FOREIGN PATENT DOCUMENTS

| | | |
|---|---|---|
| CN | 1719050 A | 1/2006 |
| CN | 200939500 Y | 8/2007 |
| EP | 323565 A1 | 7/1989 |
| EP | 1219174 B1 | 9/2006 |
| WO | WO03030648 A1 | 4/2003 |
| WO | WO03030658 B1 | 7/2003 |
| WO | WO2009135123 A3 | 6/2010 |

OTHER PUBLICATIONS

CasaHerrera, CH-51 Automated Inspection Systems, [Online], Retrieved from the Internet at http://www.casaherrera.com/machine-tortilla-flatbread-automated-inespection-systems on Nov. 9, 2010, 3 pages.

CasaHerrera, CH-51 Automated Inspection Systems, [Online], Retrieved from the Internet at http://www.casaherrera.com/managedocs/download.php?doc=brochure_vision-system_CH-51-Fiour.pdf on Nov. 9, 2010, 2 pages. Dated Nov. 22, 2010.

English Translation of EP0323565A 1, www.google.com/patents/EP0323565A1 ?cl=en, 23 pages.

42 Inch Shimming Procedures. Lawrence Equipment. Jan. 2009. 13 pages.

"52 Inch Shimming Procedures," Lawrence Equipment, Jan. 2009, 18 pages.

"Shimming Procedures," Lawrence Equipment, Oct. 2010, 4 pages.

Webpage download, Smalley, 2008, www.smalley.com/retaining_rings/about_retaining_rings.asp, 2 pages.

Webpage Download, Amazon magnetic dato shims, 2007, www.amazon.com/Systi-Matic-56060-Magnetic-Dado-Shims/dp/BOOOHDVTXM, 3 pages.

English Abstract for EP 323565 A 1.

International Search Report and Written Opinion in PCT/US2009/042519, dated Apr. 27, 2010.

Third Office Action dated Nov. 14, 2013 from corresponding Chinese Application No. 2009801258431, including English translation, 22 pages.

First Office Action dated Oct. 20, 2015, issued in related Chinese Application No. 201410361591.5, including English translation, 18 pages.

Patent Examination Report No. 1, issued in corresponding AU Patent No. 2014259512 on Mar. 15, 2016, 7 pages.

VACUUM PRESSING PLATE ASSEMBLY

CROSS-REFERENCE TO RELATED APPLICATIONS

The present application is a continuation application of U.S. patent application Ser. No. 12/434,099, filed May 1, 2009, and claims the benefit of U.S. Provisional Patent Application No. 61/049,685 titled "Vacuum Pressing Platen Assembly and Method for Adjustment" filed May 1, 2008, the contents of which are incorporated by reference in this disclosure in its entirety.

BACKGROUND OF THE INVENTION

1. Field of the Invention

The present invention is directed to a food press having a platen that moves up and down to press doughballs on a conveyor, and more particularly to a food press for tortillas.

2. Description of Related Art

In making food products, such as tortillas, doughballs are typically flattened by a press unit. The doughballs are generally moved on a conveyor belt to and through the press unit. When the doughballs are properly positioned in the press unit, an upper pressing platen is moved downwardly with an appropriate force and spacing from a lower pressing platen to press the dough balls to a desired thickness and shape.

Typically, one or both of the pressing platens are heated for parbaking the dough balls to maintain a flattened condition and proper texture. Following pressing, the upper pressing platen is raised and the conveyor belt is advanced to move the flattened dough balls from the press and to advance new dough balls to the press for repeating the cycle.

In a typical prior art system, the upper platen has a pressing/heating plate, a backing structure (which is typically an insulation plate, and a supporting framework) and a Teflon platen cover in some way attached to the pressing/heating plate. Unless precision is achieved in the flatness of the pressing surface, the pressed dough does not have a uniform circumference. To achieve the necessary tolerances, thin shims are placed between the pressing/heating plate and the insulation plate. Since the plates are bolted to a frame, the task of placing, removing, and testing the shims is very time consuming. One must typically wait a period of time to cool down the parts before attempting to perform a "shimming".

Regarding the Teflon platen cover: In spite of the fact that tension is applied to pull the cover taught over the surface of the upper platen, when the top platen elevates each cycle, small gaps of air separate the platen cover from the heat platen. This condition produces wide platen cover surface temperatures variations that result in inconsistent diameters of pressed product.

Regarding the pressing/heating plate, if the pressing plate is too thin, the process of bolting the plates warps the pressing plate, resulting in uneven heat transfer. A thicker pressing plate is therefore necessary to avoid warping. A thicker pressing plate, however, also results in problems with heat transfer when separated from the heating plate by shims.

Other prior art systems use thin pressing plates held by edge clamps to hold the backing plate to the heating plate; however, these systems have bad contact across the width resulting in inconsistent heat transfer and poor roundness and size control.

Further regarding Teflon platen covers, platen covers rapidly wear out under the heat and pressure conditions of the press. Even when not fully worn out, the platen cover can develop defective areas or holes. Replacing the platen cover is costly and time consuming, and requires that the press stop operation, causing lost production time. Moreover, when the platen is heated, replacement of the cover requires either that the press stop operation until the platen cools down or that employees risk being burned.

In an attempt to remedy the shortcomings of the prior art, U.S. Pat. No. 5,649,473, the entire contents of which are incorporated herein by reference, teaches a platen cover belt on spools positioned over the pressing plate. Once a portion of the cover belt is compromised, the cover belt can be advanced on the spools so that a new portion of the cover belt can be used. However, this system does not alleviate the need for placing shims between the bolted backing plate and heating plate. Moreover, the belt adds complexity and expense to the system.

Prior art also has the problem that when dough sticks to the Teflon platen cover it pulls against the bottom belt. This creates small air gaps between the platen cover and the Teflon platen cover belt that results in uneven temperature on the Teflon Platen cover belt. Uneven temperature, even in a properly shimmed press can produce shape and diameter irregularities. The precision shimming that is required to produce the best consistency changes depending upon the array of dough balls a producer wants to make. Smaller desired diameters are higher in number per cycle, while larger diameters are fewer in number per cycle. The result is a need to shim for each array that a producer wants to use if the best quality is desired. With many producers making array changes multiple times per day, the cost of re-shimming each array is quite high; so, either the quality is inconsistent with high productivity, or productivity is low with high quality.

What is needed is a better platen system that allows for fast placement of shims, easy removal and replacement of the pressing surface, improved heat transfer characteristics, and close and uniform contact between the plates and shims.

BRIEF SUMMARY OF THE INVENTION

Accordingly, the present invention is directed to a dough forming apparatus comprising a lower support frame, a lower pressing platen coupled to the lower support frame, an upper pressing platen assembly comprising a backing structure, an upper backing platen coupled to the backing structure, the upper backing platen having a cover side, one or more heater channels formed throughout the upper backing platen, and a pressing plate removably coupled to the cover side of the upper backing platen by vacuum or electromagnetic means. One or more heating elements may be positioned inside of the heater channels. A conveyor supported by the lower support frame is positioned to pass between the lower pressing platen and the upper pressing platen assembly.

In an embodiment of the present invention, the upper backing platen further comprises a geometry of grooves disposed upon the cover side and a vacuum hole comprising an opening in the cover side in fluid communication with one or more grooves, and the pressing plate is removably coupled to the cover side of the upper backing platen by vacuum means.

In another embodiment, the upper backing platen further comprises a notch around a perimeter of the upper backing platen, a plurality of edge members removably coupled to the upper backing platen in the notch, and a gasket removably held between the upper backing platen and the plurality of edge members. The gasket is configured to preserve the vacuum between the upper backing platen and the pressing plate.

In another embodiment, the lower pressing platen comprises a lower backing platen coupled to the lower support frame, and a lower pressing plate removably coupled to the lower backing platen by a vacuum.

Preferably, one or more shims are disposed between the pressing plate and the cover side of the upper backing platen. One or more of the shims may be circular. Preferably, the pressing plate has a lip for aligning the pressing plate on the upper backing platen.

Additionally, the present invention is directed to a method for adjusting an apparatus as described above, the method comprising the steps of lowering the upper backing platen assembly to a lowered position, disabling the vacuum to release the pressing plate from the upper backing platen and onto the conveyor, raising the upper backing platen to a raised position, moving the conveyor to advance the pressing plate from under the upper backing platen, placing one or more shims on the pressing plate, reversing the conveyor to return the pressing plate under the upper backing platen, lowering the upper pressing platen assembly to the lowered position, and enabling the vacuum to couple the pressing plate to the upper backing platen. The method may also include the step of indexing the position of the conveyor after the raising step, and returning the conveyor to the indexed position during the reversing step.

BRIEF DESCRIPTION OF THE DRAWINGS

A better understanding of the present invention will be had with reference to the accompanying drawings in which.

DETAILED DESCRIPTION OF THE INVENTION

The invention solves the shortcomings of the prior art by providing an upper pressing platen assembly having a pressing plate removably coupled to an upper backing platen. The upper pressing platen assembly permits placement of shims between the pressing plate and the upper backing platen. In a preferred embodiment of the present invention, the pressing plate is held against the upper backing platen by vacuum suction as discussed below.

Figure 1:
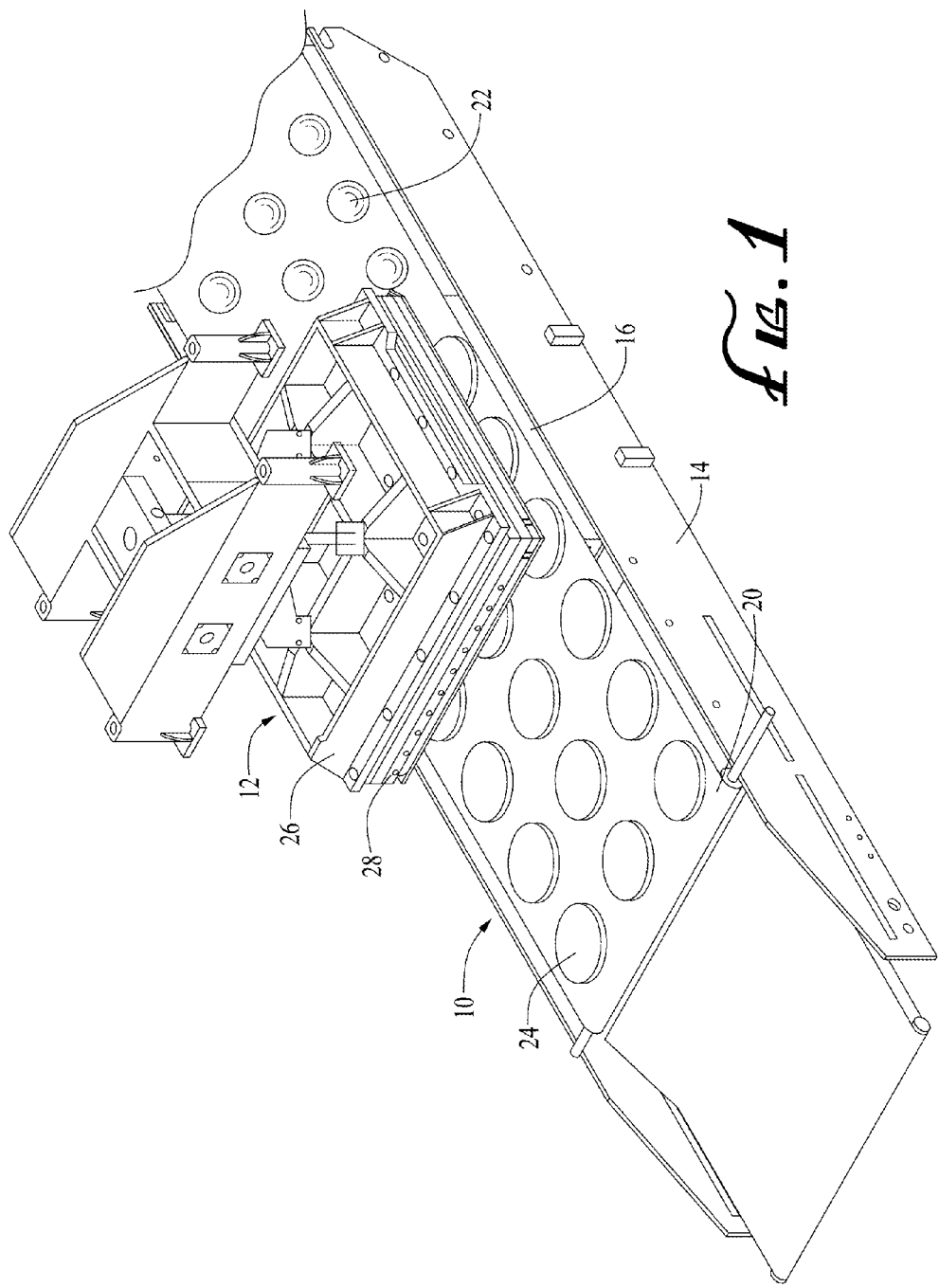
FIG. 1 is a perspective view of a press according to an embodiment of the present invention showing dough ball pressing.

An overview of a dough forming press 10 employing an upper vacuum pressing platen assembly 12 according to an embodiment of the present invention is shown in FIG. 1. The press 10 has a lower support frame 14. A lower pressing platen 16 is coupled to the lower support frame 14. The upper vacuum pressing platen assembly 12 is positioned above the lower pressing platen 16. A conveyor 20 supported by the lower support frame 14 passes between the lower pressing platen 16 and the upper vacuum pressing platen assembly 12.

A plurality of dough balls 22 are loaded onto the conveyor by a loader (not shown). The dough balls are moved between the lower platen 16 and the upper vacuum pressing platen assembly 12 where they are pressed into flattened dough pieces 24, such as tortillas.

The upper vacuum pressing platen assembly 12 will now be considered in more detail with reference to FIGS. 2 to 7. The upper vacuum pressing platen assembly 12 has a backing structure 26. On the backing structure 26 is mounted an insulation plate (not shown) and an upper backing platen 28. As will be understood by those skilled in the art, the upper backing platen 28 can be a unitary structure or separate structures coupled together. A pressing plate 30 is removably coupled to the upper backing platen 28.

With reference to FIGS. 2 to 7, the upper backing platen has a cover side 32. A vacuum across the cover side 32 of the upper backing platen 28 is created by suction through a vacuum hole 34 in the center of the upper backing platen 28. Uniformity of the vacuum is facilitated by a continuous geometry of grooves 36 on the cover side 32 of the upper backing platen 28. The grooves 36 are preferably formed in fluid communication in a checkered pattern, with at least one groove being in fluid communication with the vacuum hole 34. However, those skilled in the art will recognize that the geometry of grooves 36 can be formed in other patterns, such as circular or annular patterns, that allow the vacuum to couple the pressing plate 30 to the upper backing platen 28. The vacuum constitutes one possible means for coupling the pressing plate 30 to the upper backing platen 28. Electromagnetic means are also possible.

Heater channels 38 are formed throughout the upper backing platen 28, such as by drilling. A means for heating the upper backing platen, such as heating elements, (not shown) may be mounted in the channels 38 using, for example, an adhesive. Such a construction is advantageous, because broken heating elements can be removed from the channels 38 and replaced. Additionally, individual heating elements can be separately and variably controlled. Alternatively, a circular or annular heater may be routed inside a circular shaped channel formed in the upper backing platen 28.

In an alternative embodiment, the heater utilizes a recirculated fluid such as oil heated by a heat source. In this embodiment, a heated fluid is pumped through the channels 38 by a pump (not shown). The channels may have a variety of different shapes to distribute the heated fluid through the upper backing platen 28 so as to either heat the platen uniformly or to variably heat particular portions of the upper backing platen 28. For example, the channels 38 may be serpentine, or circular. This type of heater is advantageous because it allows for uniform heating of the platen.

Figure 6:
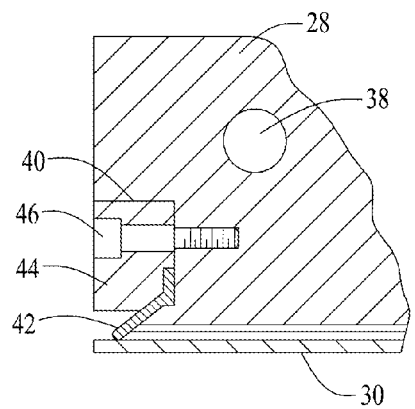
FIG. 6 is a cross sectional view of the portion of the upper backing platen and pressing plate of FIG. 5 bounded by the line 6-6.
Figure 5:
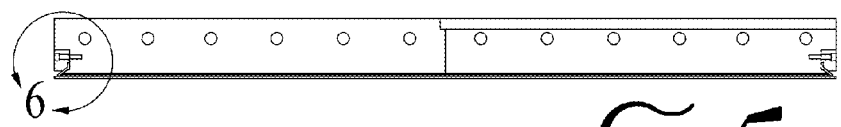
FIG. 5 is a cross sectional view of the upper backing platen (with seal) and pressing plate of FIG. 4 taken along line 5-5.

Additionally, as shown in FIG. 6, the upper backing platen 28 further comprises a notch 40 along a perimeter for placement of a seal 42. The seal 42 can be a gasket. The seal 42 is oriented so that upon coupling of the pressing plate 30 to the upper backing platen 28, air is prevented from entering between the pressing plate 30 and the upper backing platen 28. The seal 42 is placed in the notch 40 around the upper backing platen 28, and a plurality of edge members 44 are removably attached to the upper backing platen 28 to hold the seal 42 in place. Preferably, the edge members 44 are held in place using fasteners 46, such as bolts, so that the edge members 44 clamp the seal 42 in place allowing removal and replacement as necessary.

Figure 2:
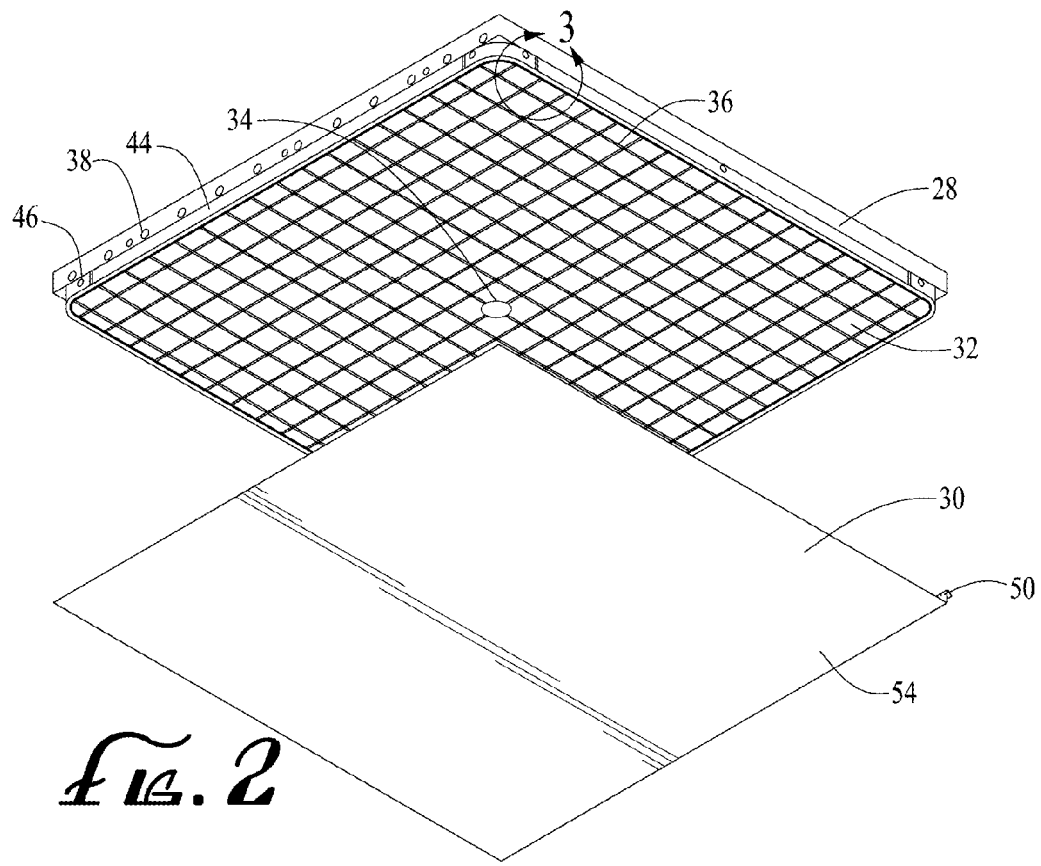
FIG. 2 is an exploded perspective view of an upper backing platen (without seal) and pressing plate usable in the press of FIG. 1.
Figure 3:
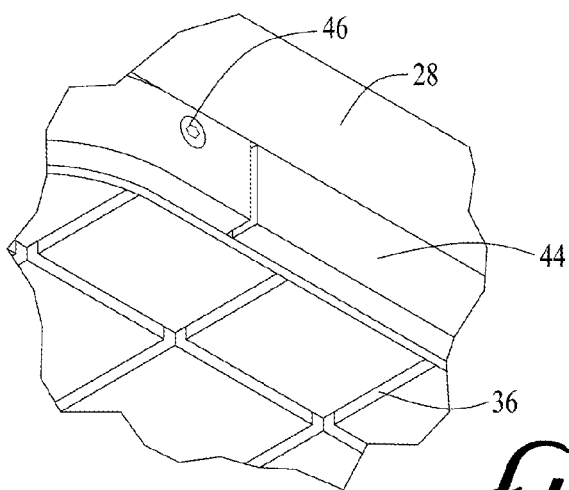
FIG. 3 is a detailed view of the upper backing platen (without seal) of FIG. 2 taken along line 3-3.
Figure 8:
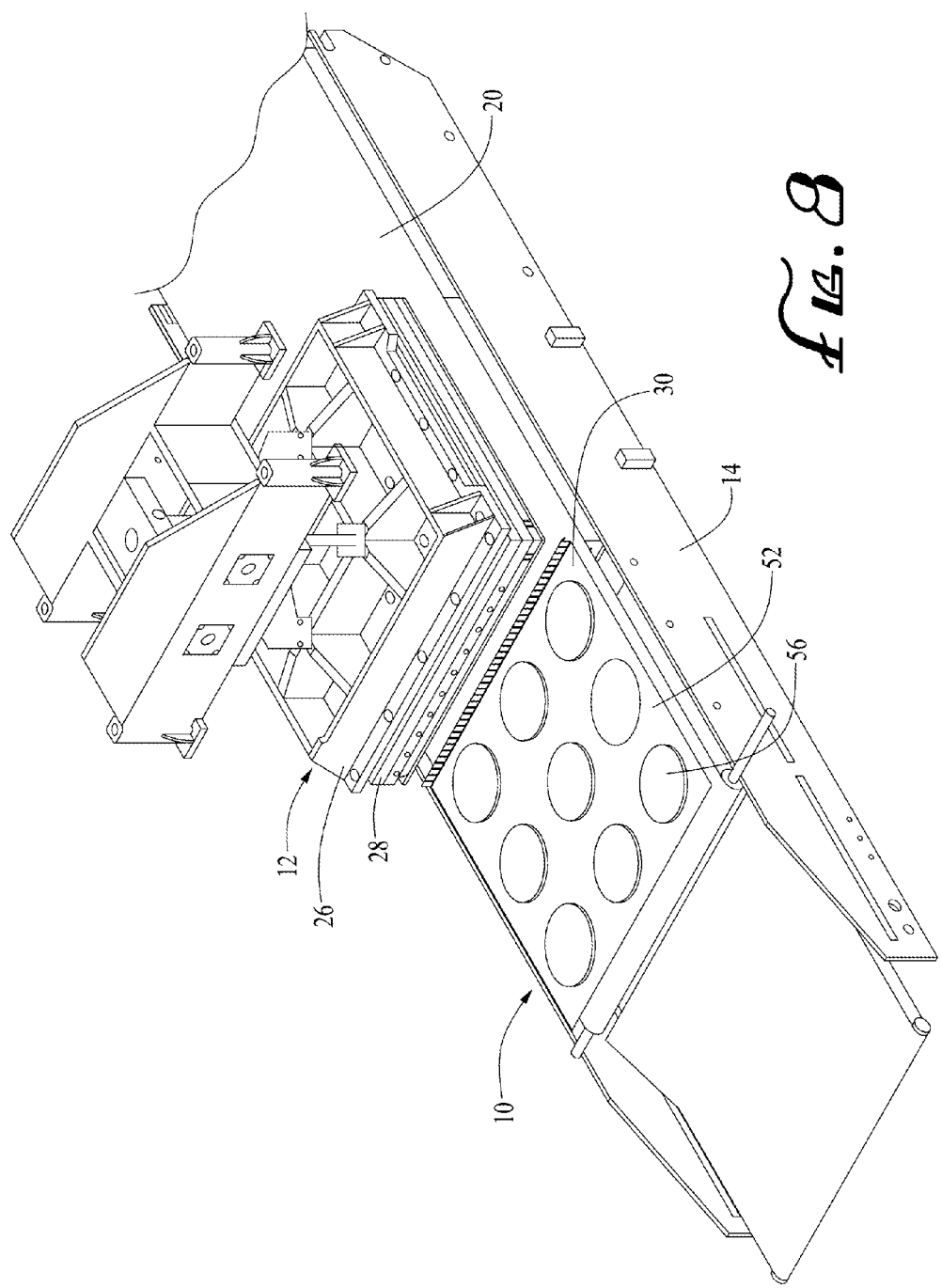
FIG. 8 a perspective view of a press according to an embodiment of the present invention showing shim placement on a pressing plate.
Figure 9:
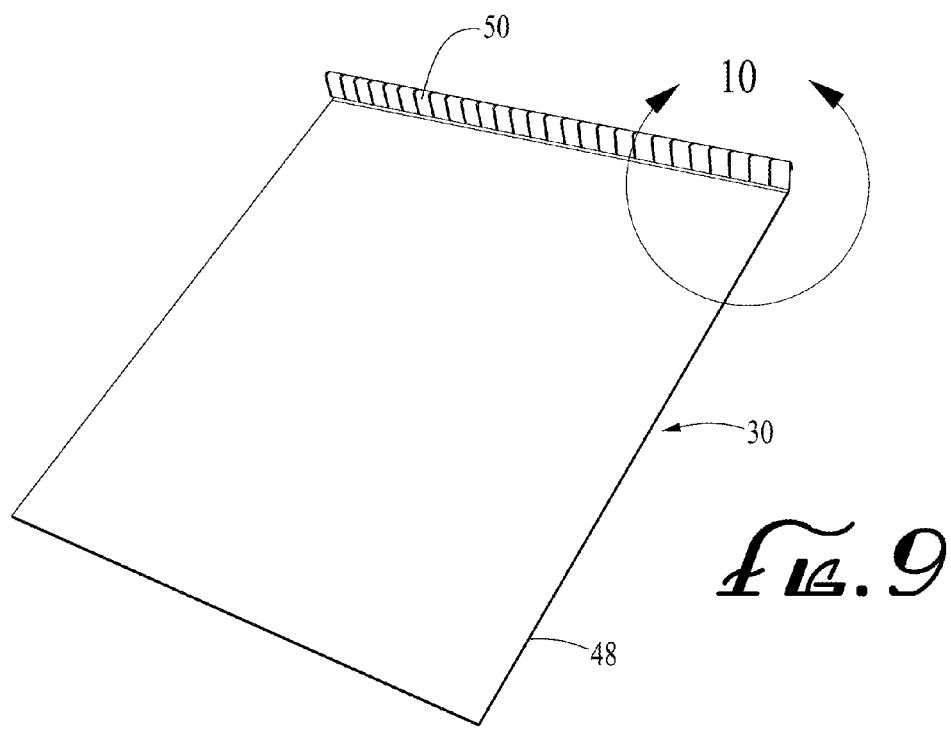
FIG. 9 is a top perspective view of a pressing plate usable in the press of FIG. 1.
Figure 10:
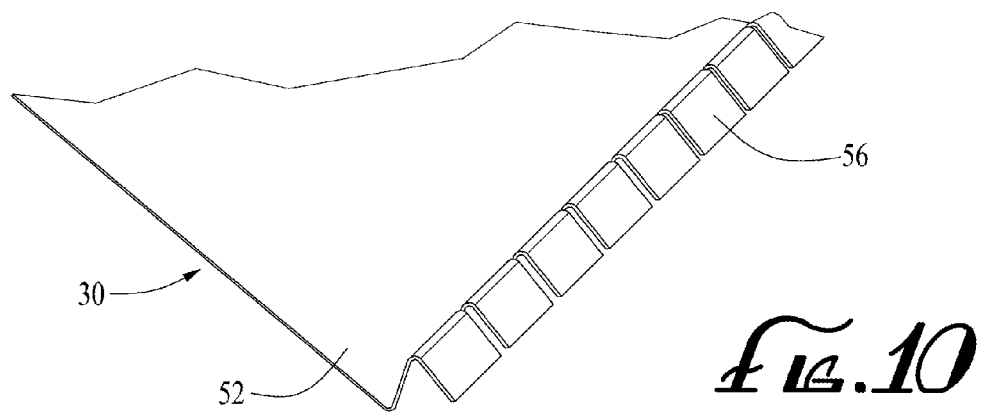
FIG. 10 is a detailed view of the pressing plate of FIG. 9 taken along line 10-10.

With reference to FIGS. 2, 8 and 9, in one preferred embodiment the pressing plate 30 has a contact portion 48 and an optional lip 50. The contact portion 48 has a platen side 52 and a dough side 54. Preferably, the pressing plate 30 is made of aluminum or stainless steel. Those skilled in the art will recognize that the pressing plate 30 can be made from other materials known in the art to be capable of withstanding the heat and pressure of dough pressing.

Figure 4:
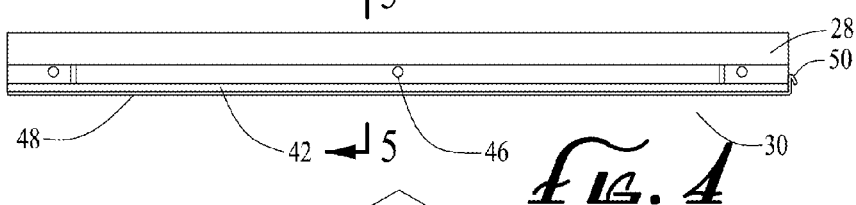
FIG. 4 is a side elevation view of the upper backing platen and pressing plate of FIG. 2 in an assembled condition.
Figure 7:
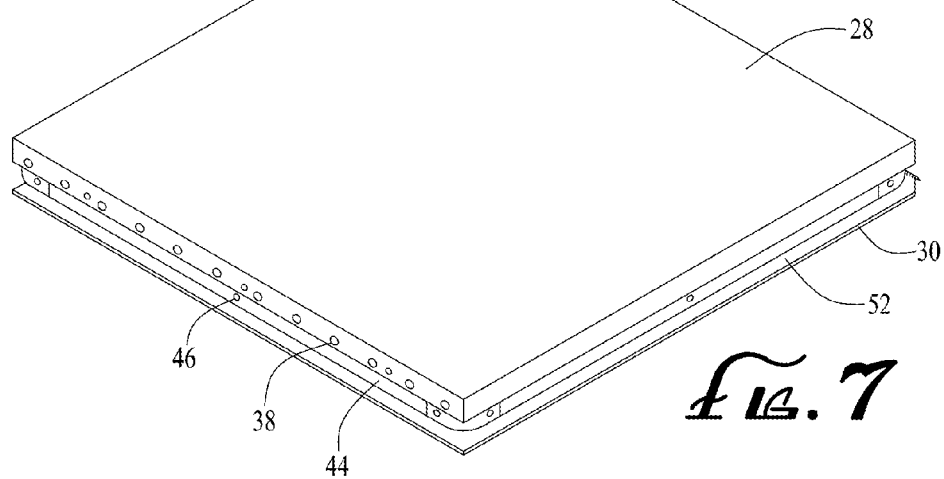
FIG. 7 is a top perspective view of the upper backing platen and pressing plate of FIG. 2.

Preferably, but optionally, the dough side 54 is coated with a non-stick material, such as Teflon®. The optional lip 50 is usable to orient the pressing plate 30 relative to the upper backing platen 28. With reference to FIGS. 2 and 4, when installed, the grooved cover side 32 of the upper backing platen 28 contacts the platen side 52 of the pressing plate 30, and the lip 50 of the pressing plate 30 is positioned along a side of upper backing platen 28.

Shims 56 are placed as desired between the platen side 52 of the pressing plate 30, and the cover side 32 of the upper backing platen 28. A small quantity of heat sink compound (not shown) may be used to lock each shim 56 in place, and improve heat transfer. When a vacuum is introduced through the vacuum hole 34, the pressing plate 30 and the shims 56 are held tightly against the cover side 32 of the upper backing platen 28. Because the pressing plate 30 is relatively thin compared to prior art, improved heat conduction characteristics result over prior art systems. Additionally, quick change of the pressing plate 30 and/or shims 56 is possible.

The present invention is also directed to an improved method of shimming a press. Initially, the upper pressing platen assembly is moved to a lowered position, wherein the pressing plate 30 is in contact with the conveyor 20. The vacuum is then disabled to release the pressing plate 30 from the upper backing platen 28 and onto the conveyor 20. The upper backing platen 28 is then raised to a raised position.

Once the upper backing platen 28 is out of the way, an index position for the conveyor 20 is recorded and the conveyor 20 is moved to advance the pressing plate from under the upper backing platen. In FIG. 8, the pressing plate 30 is shown on the conveyor 20 after having been moved out from under the upper backing platen 28.

Once the pressing plate 30 is out from under the upper backing platen 28, the pressing plate 30 can be changed or the shims 56 adjusted as desired. The conveyor is then used to move the pressing plate 30 under the upper backing platen 28 to the index position. The upper pressing platen assembly is again moved to the lowered position such that the upper backing platen 28 contacts the shims 56 and platen side 52 of the pressing plate 30. The vacuum is enabled and the pressing plate 30 is held tight to the upper backing platen 28 during heating and pressing.

To remove the pressing plate 30, a reverse pressure may be used to release the pressing plate 30 from engagement with the upper backing platen 28. A means for aligning the pressing plate 30 may be used to ensure that the pressing plate 30 has been returned to the index position. For example, a sensor can check for rotation of the pressing plate 30 as shown by mis-registration of the lip 50. A laser alignment tool could be used for this purpose.

The system of the present invention allows for very quick pressing plate 30 changing and shim 56 adjustment. There is no time lost to let the upper backing platen 28 cool down and there is little time lost in fastening and unfastening the pressing plate 30. Moreover, the use of a vacuum to hold the pressing plate 30 to the upper backing platen 28 avoids warpage of either the pressing plate 30 or the upper backing platen 28 and thereby avoids the shortcomings of the prior art. Testing shows dramatic improvement over prior art systems, in which typical pressing plate change and shim adjustment could take hours, while with the present invention the process can be accomplished in minutes.

Figure 11:
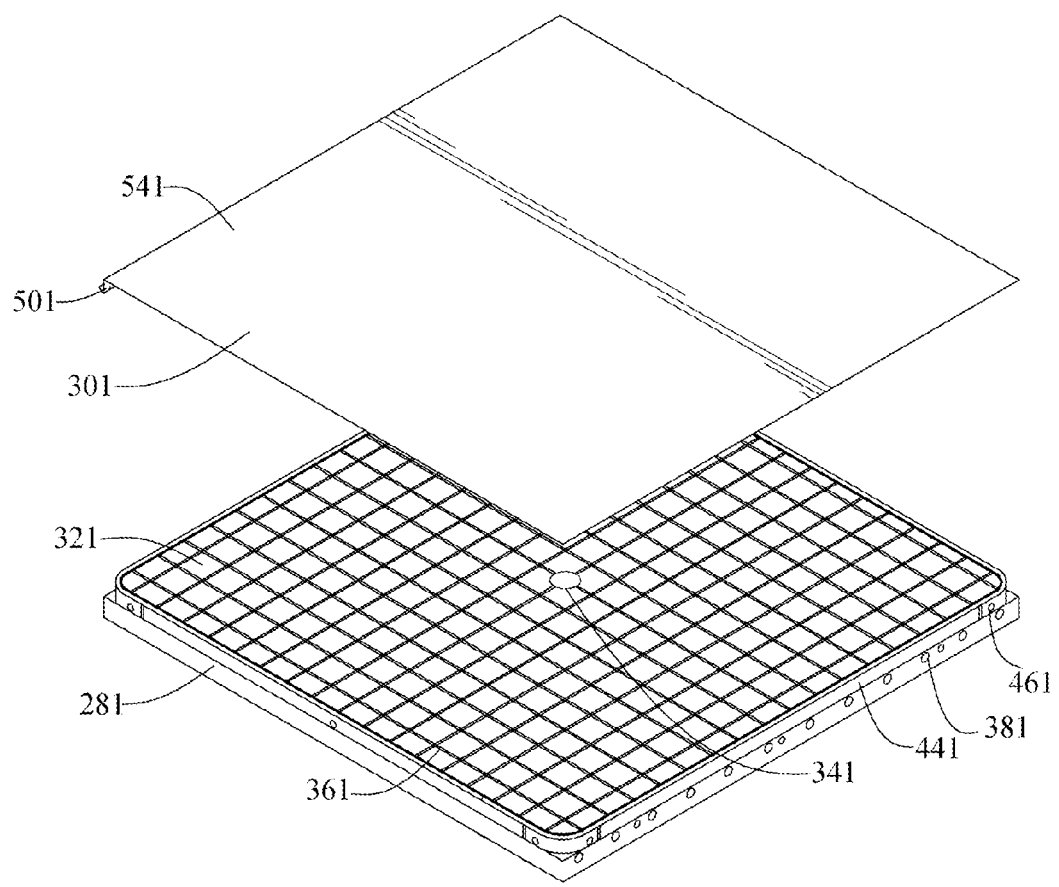
FIG. 11 is an exploded perspective view of a lower backing platen (without seal) and pressing plate usable as a lower pressing platen, in a further embodiment.

With reference to FIG. 11, in a further embodiment, lower pressing platen 16 may comprise a vacuum pressing platen assembly, either in addition to upper vacuum pressing platen assembly 12, or instead (in which later case the upper vacuum pressing assembly 12 could be replaced with a pressing platen, not shown). In this embodiment, a lower vacuum pressing platen assembly would comprise a lower backing platen 281 similar in construction to upper backing platen 28. As will be understood by those skilled in the art, the lower backing platen 281 can be a unitary structure or separate structures coupled together. A lower pressing plate 301 similar to pressing plate 30 is removably coupled to the lower backing platen 281.

The lower backing platen has a cover side 321. A vacuum across the cover side 321 of the lower backing platen 281 is created by suction through a vacuum hole 341 in the center of the lower backing platen 281. Uniformity of the vacuum is facilitated by a continuous geometry of grooves 361 on the cover side 321 of the lower backing platen 281. The grooves 361 are preferably formed in fluid communication in a checkered pattern, with at least one groove being in fluid communication with the vacuum hole 341. However, those skilled in the art will recognize that the geometry of grooves 361 can be formed in other patterns, such as circular or annular patterns, that allow the vacuum to couple the lower pressing plate 301 to the lower backing platen 281. The vacuum constitutes one possible means for coupling the lower pressing plate 301 to the lower backing platen 281. Electromagnetic means are also possible.

As with the upper assembly, heater channels 381 can be formed throughout the lower backing platen 281. Similarly, a means for heating the lower backing platen, such as heating elements, (not shown) may be mounted in the channels 381.

Similar to the upper backing platen 28, a plurality of edge members 441 are removably attached to the lower backing platen 281 to hold a seal (not shown, but similar to seal 42) in place. Preferably, the edge members 441 are held in place using fasteners 461, such as bolts, so that the edge members 441 clamp the seal in place allowing removal and replacement as necessary.

In one preferred embodiment, the lower pressing plate 301 has an optional lip 501, and a dough side 541. Preferably, the lower pressing plate 301 is made of aluminum or stainless steel. Those skilled in the art will recognize that the lower pressing plate 301 can be made from other materials known in the art to be capable of withstanding the heat and pressure of dough pressing.

Preferably, but optionally, the dough side 541 is coated with a non-stick material, such as Teflon®. The optional lip 501 is usable to orient the lower pressing plate 301 relative to the lower backing platen 281.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

As used herein, the term "coupled" means connected, such as by a pair of forces acting in parallel but opposite directions, or with a fastener, connector, adhesive, or weld, and also includes structures that are integrally formed.

Any element in a claim that does not explicitly state "means" for performing a specified function or "step" for performing a specified function, should not be interpreted as a "means" or "step" clause as specified in 35 U.S.C. §112.

The invention claimed is:

1. A method for adjusting a dough pressing apparatus having a lower support frame, a lower pressing platen coupled to the lower support frame, an upper pressing platen assembly positioned above the lower pressing platen, the upper pressing platen assembly comprising a backing structure and an upper backing platen coupled to the backing structure, a pressing plate having a platen side, the platen side removably coupled to the upper backing platen by vacuum pressure or electromagnetism, and a conveyor supported by the lower support frame positioned to pass between the lower pressing platen and the upper pressing platen assembly, comprising the steps of:
lowering the upper backing platen assembly to a lowered position;
disabling the vacuum pressure or the electromagnetism to release the pressing plate from the upper backing platen and onto the conveyor;
moving the conveyor to advance the pressing plate from under the upper backing platen;
adjusting a quantity of spacers on the pressing plate or changing the pressing plate;
reversing the conveyor to place the pressing plate under the upper backing platen; and
enabling the vacuum pressure or the electromagnetism to couple the pressing plate to the upper backing platen.

2. The method of claim 1, comprising:
raising the upper backing platen to a raised position after disabling the vacuum pressure or the electromagnetism and prior to moving the conveyor to advance the pressing plate from under the upper backing platen; and
lowering the upper pressing platen assembly to the lowered position after reversing the conveyor and prior to enabling the vacuum pressure or the electromagnetism.

3. The method of claim 2, comprising:
indexing a position of the conveyor after disabling the vacuum pressure or electromagnetism, wherein reversing the conveyor comprises returning the conveyor to the indexed position.

4. The method of claim 1, wherein adjusting the quantity of spacers on the pressing plate comprises:
placing one or more spacers on the pressing plate.

5. The method of claim 1, wherein adjusting the quantity of spacers on the pressing plate comprises:
removing one or more spacers from the pressing plate.

6. The method of claim 1, wherein:
changing the pressing plate comprises:
removing the pressing plate from the conveyor; and
placing a second pressing plate on the conveyor, the second pressing plate having a platen side;
reversing the conveyor to place the pressing plate under the upper backing platen comprises reversing the conveyor to place the second pressing plate under the upper backing platen; and
enabling the vacuum pressure or the electromagnetism to couple the pressing plate to the upper backing platen comprises enabling the vacuum pressure or the electromagnetism to couple the platen side of the second pressing plate to the upper backing platen.

7. The method of claim 6, wherein the one or more of the spacers are circular.

8. The method of claim 7, comprising:
substantially aligning each of the spacers with one of a plurality of dough products; and
pressing the plurality of dough products with the second pressing plate and the upper pressing platen assembly while each of the spacers is substantially aligned with one of the plurality of dough products.

9. The method of claim 8, comprising:
receiving the plurality of dough products onto the conveyor;
moving, by the conveyor, the plurality of dough products under the second pressing plate prior to the pressing; and
moving, by the conveyor, the plurality of dough products from under the second pressing plate after the pressing.

10. The method of claim 1, wherein disabling the vacuum pressure or the electromagnetism to release the pressing plate from the upper backing platen and onto the conveyor comprises:
applying pressure to the platen side of the pressing plate to release the pressing plate from the upper backing platen.

11. A method comprising:
coupling a first pressing plate to an upper pressing platen with vacuum pressure or electromagnetism;
lowering the upper pressing platen to a first position above a conveyor, the conveyor positioned below the upper pressing platen;
disabling the vacuum pressure or the electromagnetism to release the first pressing plate from the upper pressing platen, wherein after the vacuum pressure or the electromagnetism is disabled the first pressing plate is supported by the conveyor;
moving the first pressing plate to a second position on a first side of the upper pressing platen;
removing the first pressing plate from the conveyor;
placing a second pressing plate on the conveyor;
moving the second pressing plate to a third position below the upper pressing platen; and
coupling the second pressing plate to the upper pressing platen with the vacuum pressure or the electromagnetism.

12. The method of claim 11, wherein lowering the upper pressing platen comprises:
lowering the upper pressing platen until the first pressing plate contacts the conveyor.

13. The method of claim 11, wherein placing the second pressing plate on the conveyor comprises placing the second pressing plate on the conveyor on the first side of the upper pressing platen.

14. The method of claim 11, comprising:
raising the upper pressing platen to a raised position after disabling the vacuum pressure or the electromagnetism to release the first pressing plate from the upper pressing platen; and lowering the upper pressing platen to a lowered position before coupling the second pressing plate to the upper pressing platen with the vacuum pressure or the electromagnetism.

15. The method of claim 11, wherein a plurality of spacers are located between the second pressing plate and the upper pressing platen, the method comprising:
maintaining, after coupling the second pressing plate to the upper pressing platen with the vacuum pressure or the electromagnetism, a position of each of the plurality of spacers between the second pressing plate and the upper pressing platen;
raising the second pressing plate and the upper pressing platen to a raised position;
loading a plurality of dough balls onto the conveyor;
substantially aligning each of the plurality of spacers with one of the plurality of dough balls by moving the conveyor; and
lowering the second pressing plate and the upper pressing platen to create a plurality of flattened dough pieces while each of the plurality of spacers is substantially aligned with one of the plurality of dough balls, wherein a quantity of the plurality of dough balls is the same quantity as a quantity of the flattened dough pieces.

16. The method of claim 15, wherein each of the plurality of spacers is circular.

17. A method comprising:
coupling a platen side of a pressing plate to an upper pressing platen with vacuum pressure or electromagnetism;
lowering the upper pressing platen to a first position above a conveyor, the conveyor positioned below the upper pressing platen;
disabling the vacuum pressure or the electromagnetism to release the pressing plate from the upper pressing platen, wherein after the vacuum pressure or the electromagnetism is disabled the pressing plate is supported by the conveyor;
moving the pressing plate to a second position on a first side of the upper pressing platen;
adjusting a quantity of spacers positioned on the platen side of the pressing plate;
moving the pressing plate to a third position below the upper pressing platen; and
coupling the platen side of the pressing plate to the upper pressing platen with the vacuum pressure or the electromagnetism.

18. The method of claim 17, comprising:
raising the upper pressing platen to a raised position after disabling the vacuum pressure or the electromagnetism to release the pressing plate from the upper pressing platen; and
lowering the upper pressing platen to a lowered position before coupling the platen side of the pressing plate to the upper pressing platen with the vacuum pressure or the electromagnetism.

19. The method of claim 17, comprising:
indexing a position of the conveyor after disabling the vacuum or the electromagnetism, wherein moving the pressing plate to the third position comprises moving the conveyor to the indexed position.

20. The method of claim 17, wherein adjusting the quantity of spacers on the pressing plate comprises:
placing one or more spacers on the pressing plate.

21. The method of claim 1, wherein adjusting the quantity of spacers on the pressing plate or changing the pressing plate comprises adjusting a quantity of shims on the pressing plate.

22. The method of claim 15, wherein:
wherein the plurality of spacers are located between the second pressing plate and the upper pressing platen comprises a plurality of shims are located between the second pressing plate and the upper pressing platen;
maintaining the position of each of the plurality of spacers between the second pressing plate and the upper pressing platen comprises maintaining the position of each of the plurality of shims between the second pressing plate and the upper pressing platen;
substantially aligning each of the plurality of spacers with one of the plurality of dough balls by moving the conveyor comprises substantially aligning each of the plurality of shims with one of the plurality of dough balls by moving the conveyor; and
lowering the second pressing plate and the upper pressing platen to create a plurality of flattened dough pieces while each of the plurality of spacers is substantially aligned with one of the plurality of dough balls comprises lowering the second pressing plate and the upper pressing platen to create a plurality of flattened dough pieces while each of the plurality of shims is substantially aligned with one of the plurality of dough balls.

23. The method of claim 17 wherein adjusting the quantity of spacers positioned on the platen side of the pressing plate comprises adjusting a quantity of shims positioned on the platen side of the pressing plate.

* * * * *